United States Patent [19]

Heeringa et al.

[11] Patent Number: 4,677,028

[45] Date of Patent: Jun. 30, 1987

[54] THIXOTROPIC COATING COMPOSITION, PROCESS FOR COATING A SUBSTRATE WITH SUCH COATING COMPOSITION AND THE COATED SUBSTRATE THUS OBTAINED

[75] Inventors: Auke Heeringa, Bennebroek; Johannes P. H. Juffermans, Sassenheim; Bart Kaster, Leiden, all of Netherlands

[73] Assignee: Akzo N.V., Arnhem, Netherlands

[21] Appl. No.: 832,507

[22] Filed: Feb. 20, 1986

[30] Foreign Application Priority Data

Feb. 20, 1985 [NL] Netherlands ........................ 8500475

[51] Int. Cl.[4] ...................... C07D 251/34; C09D 5/04; C09D 7/12; C08G 18/32

[52] U.S. Cl. .............................. 428/422.8; 427/385.5; 427/388.2; 427/394; 428/423.1; 428/425.1; 428/425.8; 524/101; 524/376; 524/507; 524/558; 528/73

[58] Field of Search ....................... 524/101, 558, 507; 528/73; 428/422.8, 425.1, 423.1, 425.8; 427/385.5, 388.2, 394

[56] References Cited

U.S. PATENT DOCUMENTS

| | | | |
|---|---|---|---|
| 3,893,956 | 7/1975 | Brandt . | |
| 3,983,723 | 10/1976 | Goesfeld . | |
| 4,282,128 | 8/1981 | Honig | 524/901 |
| 4,311,622 | 1/1982 | Buter | 524/542 |
| 4,518,729 | 5/1985 | Breidenbagh et al. | 524/101 |
| 4,576,979 | 3/1986 | Schupp et al. | 524/901 |
| 4,578,424 | 3/1986 | Goel | 528/73 |
| 4,595,741 | 6/1986 | Kamatani et al. | 528/73 |
| 4,605,596 | 8/1986 | Fry | 524/101 |
| 4,608,416 | 8/1986 | Schupp et al. | 524/591 |

FOREIGN PATENT DOCUMENTS 1586508 3/1981 United Kingdom .

*Primary Examiner*—Herbert J. Lilling
*Attorney, Agent, or Firm*—Jeffrey S. Boone; F. W. Young

[57] ABSTRACT

The invention provides for a thixotropic coating composition comprising (1) a binder and (2) a sag control agent which is the reaction product of (a) an isocyanurate-trimer from a diisocyanate containing 3 to 20 carbon atoms and (b) an amine containing at least one primary amino group, the coating composition containing 0.1 to 30 percent by weight of the sag control agent. The invention also relates to a process for coating a substrate using said coating composition and to the coated substrate thus obtained.

6 Claims, No Drawings

THIXOTROPIC COATING COMPOSITION, PROCESS FOR COATING A SUBSTRATE WITH SUCH COATING COMPOSITION AND THE COATED SUBSTRATE THUS OBTAINED

BACKGROUND OF THE INVENTION

The invention relates to a thixotropic coating composition based on a binder and a polyurea compound as sag control agent.

A coating composition of the type indicated above is described in, among other places, Belgian Patent Specifications Nos. 808,465 and 808,466, which disclose the use of a reaction product of a monoisocyanate or diisocyanate and a primary or a secondary polyamine as sag control agent. British Patent Specification No. 1,586,508 describes the use of a reaction product of a diisocyanate and a monoamine or hydroxymonoamine containing 1–5 aliphatic carbon atoms. A disadvantage to the use of the above sag control agents is that the flow of the coating composition is not quite satisfactory, particularly when use is made of a relatively low curing temperature. As a result, a so-called orange-peel appearance is obtained. Moreover, those sag control agents are generally more suitable for use in coating compositions based on an organic solvent than in those based on water.

SUMMARY OF THE INVENTION

In one aspect, the invention is a thixotropic coating composition comprising (1) a binder and (2) a polyurea sag control agent which is the reaction product of (a) an isocyanuratetrimer and (b) a primary amine.

In another aspect, the invention is a method of coating a substrate with such a composition.

In yet another aspect, the invention is a substrate coated with such a composition.

An object of the present invention is to provide a universally applicable sag control agent with the use of which a coating composition is obtained which is satisfactorily thixotropic at any curing temperature, for instance, at ambient temperature or at a temperature in the range of 60° to 260°, without the use of the novel sag control agent detracting from the flow.

DETAILED DESCRIPTION OF THE INVENTION

Unless otherwise specified, the numerical ranges in the specification and claims are not critical. That is, they may be read as if prefaced by the word "about" or "substantially".

The coating composition according to the invention is characterized in that the sag control agent is the reaction product or an isocyanurate-trimer from a diisocyanate containing 3–20 carbon atoms and of an amine containing one or more primary amino groups, the sag control agent consisting of solid particles and the coating composition containing 0.1 to 30 percent by weight of the sag control agent. For brevity, the isocyanurate-trimer from a diisocyanate will hereinafter be referred to as heterocyclic triisocyanate and the amine containing one or more primary amino groups as primary amine.

The binder that can be thixotropized according to the invention may as a rule be any arbitrarily chosen binder. As suitable examples may be mentioned: ester diols; polyesters; polyurethanes; alkyd resins, which may be modified or not with oil; acrylate resins or methacrylate resins; epoxy resins modified or not with oil; copolymers of a (meth)acrylate monomer, styrene and/or vinyl chloride; unsaturated polyester resins which may optionally be mixed with styrene and/or one or more other monomeric compounds, for instance a (meth)acrylate monomer or an allyl compound; water-dilutable alkyd resins; water-dilutable polyesters or ester diols; water-dilutable polyurethanes, water-dilutable acrylate resins; drying or non-drying oils, stand oil and other synthetic or natural resins.

Optionally, the coating composition may also contain a curing agent for the binder. When the binder contains hydroxyl groups, the usual curing agents are for example: N-methylol groups and/or N-methylol ether groups-containing amino resins obtained by reacting an aldehyde, such as formaldehyde, with a compound containing amino groups or amido groups, such as melamine, urea, N,N'-ethylene diurea, dicyandiamide and benzoguanamine; for the preparation of such compounds see Houben-Weyl, Methoden der organischen Chemie, Band 14/2, pp. 319–371 (1963). It is preferred that the afore-described compounds should entirely or partly be etherified with alcohols having 1 to 6 carbon atoms, for instance with methanol, ethanol, n-propanol, isopropanol, n-butanol, isobutanol, amyl alcohol, hexanol or mixtures of the alcohols referred to above. Particularly, use is made of a methylol melamine containing 4 to 6 methylol groups per molecule of melamine, at least 3 methylol groups being etherified with methanol, ethanol, a propanol or a butanol, or a butanoletherified condensation product of formaldehyde and N,N'-ethylene diurea. More particularly, use is made of a hexaalkoxymethyl melamine whose alkoxy group contains 1 to 4 carbon atoms. Instead of or besides the above-described curing agents other suitable agents may be used, such as blocked or non-blocked isocyanurate compounds or blocked or non-blocked aliphatic, cycloaliphatic heterocyclic or aromatic di-, tri- or polyvalent isocyanates. As examples of suitable isocyanates may be mentioned hexamethylene diisocyanate, 2,2,4-trimethylhexane-1,6-diisocyanate, 2,4,4-trimethylhexane-1,6-diisocyanate, cyclohexyl-1,4-diisocyanate, isophoron diisocyanate, the adduct of 1 molecule of 1,4-butanediol and 2 molecules of isophoron diisocyanate, the adduct of 1 molecule of 1,4-butanediol and 2 molecules of hexamethylene diisocyanate, dicyclohexylmethane-4,4'-diisocyanate, xylylene diisocyanate, 1,3,5-trimethyl-2,4-bis(isocyanatomethyl)benzene, toluene diisocyanate, diphenylmethane-4,4'-diisocyanate, the adduct of 3 molecules of hexamethylene diisocyanate and 1 molecule of water, the adduct of 1 molecule of trimethylol propane and 3 molecules of isophoron diisocyanate, the adduct of 1 molecule of trimethylol propane and 3 molecules of toluene diisocyanate and the adduct of 1 molecule of pentaerythritol and 4 molecules of hexamethylene diisocyanate. The isocyanate or isocyanurate compound may optionally be blocked with any usual or suitable blocking agent. When use is made of a hydroxyl groups-containing binder, the curing agent is contained in the coating composition in an amount such that the molar ratio of the reactive groups of the curing agent to those of the hydroxyl groups-containing polymer is between 0.6 and 1.5 and preferably between 0.7 and 1.3.

According to the invention the isocyanurate-trimer to be used for the preparation of the sag control agent is preferably built up from a diisocyanate containing 5–14 carbon atoms, particularly from a diisocyanate containing 8–12 carbon atoms, more particularly from hexamethylene diisocyanate. As examples of suitable diisocyanates may be mentioned methylene diisocyanate, trimethylene diisocyanate, tetramethylene diisocyanate, hexamethylene diisocyanate, ω,ω'-dipropylether diisocyanate, thiodipropyl diisocyanate, cyclohexyl-1,4-diisocyanate, dicyclohexylmethane-4,4'-diisocyanate, 1,5-dimethyl-2,4-bis(isocyanatomethyl)benzene, 1,5-dimethyl-2,4-bis(ω-isocyanatoethyl)benzene, 1,3,5-trimethyl-2,4-bis(isocyanatomethyl)benzene, 1,3,5-triethyl-2,4-bis(isocyanatomethyl)benzene, a heterocyclic diisocyanate as available under the trade mark Desmodur TT of Bayer, dicyclohexyldimethylmethane-4,4'-diisocyanate, 1,4-toluene diisocyanate, 2,6-toluene diisocyanate and diphenylmethane-4,4'-diisocyanate. If desired, use may also be made of a heterocyclic trimer of 2 or 3 different diisocyanates. Optionally, use may be made of mixtures of the heterocyclic triisocyanates referred to above.

As examples of suitable primary amines, the second component from which the sag control agent according to the invention is built up, may be mentioned benzylamine, ethylamine, n-propylamine, sec. propylamine, n-butylamine, sec. butylamine, tert. butylamine, n-pentylamine, α-methylbutylamine, α-ethylpropylamine, β-ethylbutylamine, hexylamine, octylamine, decylamine, stearylamine, cyclohexylamine, aniline and hexamethylene diamine. The primary amines generally contain not more than 55 carbon atoms, preferably 1–24 and more particularly 1–12 carbon atoms. Amines containing one or more primary amino groups and one or more ether and/or hydroxyl groups are also applicable; for example: ethanolamine, 6-aminohexanol, p-methoxybenzylamine, methoxypropylamine, 3,4-dimethoxyphenyl-ethylamine, 2,5-dimethoxyaniline, furfurylamine, tetrahydrofurfurylamine and bis(3-aminopropyl)-polytetrahydrofuran having a molecular weight of about 750. Mixtures of the amines referred to above are also applicable.

In the reaction between the heterocyclic triisocyanate and the primary amine for preparing the sag control agent generally either the heterocyclic triisocyanate or the primary amine may be used in excess relative to the stoichiometric amount. For example, the ratio of the number of amino groups of the primary amine to the number of isocyanate groups of the heterocyclic triisocyanate may be between 0.7 and 1.5 and preferably between 0.9 and 1.1.

The reaction between the heterocyclic triisocyanate and the primary amine may generally be carried out in any arbitrarily chosen way by combining the reaction components, optionally at elevated temperature. It is preferred that the reaction should be carried out at a temperature in the range of 10° to 150° C., more particularly in the range of 20° to 80° C. Although in general the reaction components may be combined in any arbitrarily chosen manner, it is as a rule preferred that the heterocyclic triisocyanate should be added to the primary amine, which may be done in several steps, if desired. Generally, the reaction is carried out in the presence of a solvent, for instance acetone, methyl isobutyl ketone, 1-methoxy-propanol-2, benzene, toluene, xylene or aliphatic hydrocarbons such as petroleum ether.

The preparation of the sag control agent may optionally also be carried out in the presence of a binder, a curing agent and/or some starting compound for the binder or the curing agent. It is preferred then that a solution of the heterocyclic triisocyanate should be mixed with a mixture of the primary amine and the binder. Mixing may be carried out in any convenient manner, with the reactants being vigorously stirred. In a preferred embodiment of this process a binder is mixed with the heterocyclic triisocyanate and the primary amine in amounts such that upon conclusion of the reaction there is obtained a mixture that may optionally be used as master batch of the sag control agent, consisting of 0.1–30 by weight, preferably 1–10% by weight of the sag control agent and 70–99.9% by weight, preferably 90–99% by weight of the binder. Said weight ratios generally result in obtaining a viscous mixture which can very readily be homogeneously mixed with the binder to be employed in the preparation of the thixotropic coating composition and/or with the optionally employed curing agent. The binders and/or optional curing agents in the thixotropic coating composition and in the master batch may be of the same or of different composition. Particular, if only small amounts of the master batch need be added to the coating composition, the respective binders and/or curing agents differ. In this "in situ" preparation the reaction is preferably carried out at a temperature in the range of 20° to 80° C., in which case first the primary amine is added to the binder and, after the mixture has been homogenized, the heterocyclic triisocyanate is added to the mixture with stirring.

If the sag control agent is not prepared in situ in the binder, the two components of the thixotropic coating composition can be mixed by melting and mixing the sag control agent at a temperature in the range of 80° to 200° C. in the presence of the binder, as a result of which a homogeneous mixture is obtained. After the mixture has been cooled to room temperature, the sag control agent forms a dispersion in the binder and the resulting thixotropic coating composition may have an opaque, an opalescent or even a transparent appearance, depending on the size of the refractive index of the dispersed particles of the sag control agent.

The degree to which the coating composition is thixotropic, of course, depends on the proportion of sag control agent and the nature of the sag control agent and the binder. As a rule, the desired degree of thixotropy may be obtained by employing the sag control agent in an amount of 0.1 to 30, and preferably 1 to 10 percent by weight, based on the total amount of coating composition.

The action of the sag control agent according to the invention is not or hardly affected by water and/or an organic solvent contained in the thixotropic coating composition, so that the present sag control agent is universally applicable and may advantageously be used in compositions that mainly contain an organic solvent or water as dispersing agent. Nor is the thixotropy affected at elevated temperature, so that the sag control agent according to the invention is very suitable for use in baking paints, which are usually cured at a temperature in the range of 60° to 260° C. The sag control agent in the coating composition according to the invention generally has a particle size of 0.01–50 μm, preferably 0.1–20 μm. The particle size is determined with the aid of a Hegman Fineness-of-Grind gauge.

The sag control agents according to the invention are particularly suitable for use in coating compositions having a high solids content, because they hardly or not at all increase the viscosity of the coating composition under processing conditions, so that no solvent or only a very small amount thereof is needed to bring the coating composition in an applicable state. By a coating composition having a high solids content is to be understood here a composition having a solids content of at least 60 percent by weight. The solids content is determined in accordance with ASTM Method D 1644-59 with heating for 1 hour at 105° C. The sag control agent according to the invention further has the considerable advantage that it does not or hardly decrease the gloss of the composition. This is in sharp contrast to the effect produced by other sag control agents such as Aerosil (registered trademark) and other silicates.

Depending on the binder employed, any conventional compound can be used as curing agent. The coating composition may further contain usual adjuvants and additives, for instance pigment dispersants, colourants, metallic or non-metallic pigments, solvents and accelerators for the curing reaction, for instance acidic compounds such as p-toluene sulphonic acid or blocked products thereof.

The thixotropic coating composition may be applied to a substrate in any desirable manner, for instance by roller coating, spraying, brushing, sprinkling, flow coating, dipping or electrostatic spraying. Suitable substrates are for instance those of wood, synthetic materials, and pre-treated or non-pretreated metals.

The thixotropic coating composition may further be cured or baked in the usual way, for instance at ambient temperature or in an oven at the usual temperatures, for instance in the range of 60° to 260° C., over a period of 1 to 120 minutes.

The invention will be further described in the following, unlimitative examples. The term resin A as used in them refers to a polyacrylate having a number average molecular weight of 500–1000, which resin is built up from 20% by weight of styrene, 25% by weight of butyl methacrylate, 25% by weight of 2-ethylhexyl acrylate and 30% by weight of hydroxyethyl acrylate; the term resin B as used in them refers to a polyacrylate having a number average molecular weight of about 5000, which resin is built up from 35% by weight of styrene, 25% by weight of methyl methacrylate, 25% by weight of butyl acrylate and 15% by weight of hydroxypropyl methacrylate; the term resin C used in them refers to an alkyd resin having a number average molecular weight of about 1500, which resin is built up from 34% by weight of phthalic anhydride, 31% by weight of 3,3,5-trimethylcaproic acid and 35% by weight of trimethylol propane; the term resin D refers to an alkyd resin having a high fatty acid content and a number average molecular weight of about 2000, which resin is built up from 63% by eight of soybean oil fatty acid, 19% by weight of phthalic anhydride, 5% by weight of 1,2-propane diol and 13% by weight of pentaerythritol and the term resin E refers to a polyester resin having a number average molecular weight of about 2500, which resin is built up from 50% by weight of trimethylol propane and 50% by weight of phthalic anhydride. As heterocyclic triisocyanate the representative heterocyclic trimer of hexamethylene diisocyanate was used; the trimer was applied as a 90% by weight solution in ethylglycol acetate. Other heterocyclic trimers of a diisocyanate lead to similar results. Solvesso 150 (a trademark of Esso) is a high-boiling mixture of aromatic hydrocarbons. In the examples "parts" refers to "parts by weight" and "%" to "percentage by weight", unless otherwise indicated. The spraying consistency is given in seconds efflux time at 20° C., measured with a DIN cup No. 4. The thickness of a coating was determined on a coating in the cured state.

EXAMPLE 1

To a mixture of 500.0 parts of a 76.5%-solution of resin A in butyl acetate and 5.42 parts of benzylamine was added with vigorous stirring and at room temperature a solution of 10.96 parts of the heterocyclic triisocyanate in 30 parts of xylene. Subsequently, the reaction mixture was stirred for another 5 minutes.

To 25.0 parts of the resulting thixotropic resin solution were still added 8.0 parts of hexamethoxymethyl melamine, 11.5 parts of a 76.5%-solution in butyl acetate of resin A, 24.5 parts of rutile titanium dioxide, 2.0 parts of a 20%-solution in isopropanol of p-toluene sulphonic acid and 20 parts of xylene. The composition prepared had a solids content of 65% at a spraying consistency of 30 seconds. Subsequently, the resulting thixotropic composition was applied to a vertically positioned steel panel in various coating thicknesses. While kept in its vertical position the steel panel was then cured in a baking oven for 20 minutes at 130° C. The thixotropic composition only started showing sagging at a coating thickness of at least 55 μm. The gloss of the cured coating was excellent. A composition without the sag control agent indicated in this example, but of otherwise the same formulation, already displayed sagging at a coating thickness of 30 μm.

EXAMPLE 2

To a mixture of 500.0 parts of an 80%-solution in Solvesso 150 of resin C and 6.29 parts of cyclohexylamine was added with vigorous stirring and at room temperature a solution in 20 parts of Solvesso 150 of 13.7 parts of the heterocyclic triisocyanate. Subsequently, the reaction mixture was stirred for another 5 minutes.

To 122.5 parts of he thixotropic resin solution thus prepared were still added 110.0 parts of a 60%-solution in butanol of a partially butoxylated melamine resin, 38.5 parts of an 80%-solution in Solvesso 150 of resin C, 133.5 parts of rutile titanium dioxide, 157 parts of xylene and 30 parts of dipentene. The composition prepared had a solids content of 55% at a spraying consistency of 25 seconds.

The resulting thixotropic composition was applied in the same way as indicated in Example 1. The composition only started showing sagging at a coating thickness of at least 57 μm. Without the sag control agent given in this example the composition already displayed sagging at a coating thickness of 33 μm.

EXAMPLE 3

To a mixture of 600.0 parts of a 65%-solution of resin E in ethyl glycol acetate and 6.91 parts of benzylamine was added with vigorous stirring and at room temperature a solution of 13.99 parts of the heterocyclic triisocyanate in 20 parts or ethyl glycol acetate. Next, the reaction mixture was stirred for 5 more minutes.

To 37.0 parts of the resulting thixotropic resin solution were still added 16.0 parts of a 65%-solution in ethyl glycol acetate of resin E, 35.0 parts of rutile titanium dioxide, 37.5 parts of the linear trimer of hexamethylene diisocyanate (available under the trade mark Desmodur N of Bayer) as curing agent and 83 parts of ethyl glycol acetate. The composition prepared had a solids content of 46% at a spraying consistency of 13 seconds.

Only 1 hour after the components had been intermixed was the thixotropic composition applied in the same way as indicated in Example 1. The coating applied was cured at room temperature. The composition only started showing sagging at a coating thickness of at least 72 μm. In a comparative experiment without sag control agent the composition already displayed sagging at a coating thickness of 48 μm, the gloss of the two coatings having the same value (85 gloss units at 20° C.).

EXAMPLE 4

To a mixture of 500.0 parts of 50% -solution in xylene of resin B and 7.23 parts of benzylamine were added with vigorous stirring and at room temperature a solution of 14.63 parts of the heterocyclic triisocyanate and 10 parts of xylene. Subsequently, the reaction mixture was stirred for another 5 minutes.

To 35.0 parts of the resulting thixotropic resin solution were still added 19.5 parts of a 60%-solution in butanol of a partially butoxylated melamine resin, 20.0 parts of a 50%-solution in xylene or resin B, 8.1 parts of metallic aluminium, 10 parts of butyl acetate and 40 parts of xylene. The composition prepared had a solids content of 30% of a spraying consistency of 17 seconds.

Subsequently, the thixotropic composition obtained was applied to a steel panel, which was then cured, while in a vertical position, in a baking oven for 17 minutes at 130° C. The thixotropic composition only started showing sagging at a coating thickness of at least 50 μm. In another experiment the thixotropic composition obtained was applied to a steel panel in a coating thickness of 40 μm and cured for 17 minutes at a temperature of 130° C. Upon inspection the clarity of the cured coating was found to be better than that of a coating of a similar composition without the sag control agent.

EXAMPLE 5

To a mixture of 500.0 parts of resin D and 7.84 parts of methoxypropylamine was added with vigorous stirring and at room temperature a solution in 20 parts of xylene of 19.06 parts of the heterocyclic triisocyanate. The reaction mixture was subsequently stirred for another 5 minutes.

To 38.6 parts of the resulting thixotropic resin solution were still added 52.8 parts of resin D, 77.4 parts of rutile titanium dioxide, 16.2 parts of a solution of cobalt octoate (0.38%, based on total), zirconium octoate (3.45%, based on total) and calcium octoate (1.81%, based on total) in 20.0 parts of white spirit. The composition prepared had a solids content of 81.5%.

Subsequently, the thixotropic composition was applied to a glass plate in various coating thicknesses, and, with the plate in vertical position, cured at 20° C. The thixotropic composition only started showing sagging at a coating thickness of at least 100 μm. The gloss of the cured coating was excellent and the levelling of the composition had improved. A composition without the sag control agent indicated in this example, but of otherwise the same formulation, already displayed sagging at a coating thickness of 75 μm.

EXAMPLE 6

To a mixture of 500.0 parts of a 76.5-solution in butylacetate of resin A and 3.91 parts of hexamethylene diamine was added with vigorous stirring and at room temperature a solution in 35.0 parts of xylene of 16.91 parts ot the heterocyclic triisocyanate. Subsequently, the reaction mixture was stirred for another 5 minutes.

To 25.4 parts of the thixotropic resin solution thus prepared were still added 9.0 parts of hexamethoxymethyl melamine, 11.5 parts of a 76.5%-solution in butyl acetate of resin A, 24.5 parts of rutile titanium dioxide, 2.0 parts of a 20%-solution in isopropanol of p-toluene sulphonic acid and 20 parts of xylene. The composition prepared had a solids content of 65% at a spraying consistency of 30 seconds.

Subsequently, the thixotropic composition obtained was applied in various coating thicknesses to a vertically positioned steel panel, which while in its vertical position was then cured in a baking oven for 20 minutes at 130° C. The thixotropic composition only started showing sagging at a coating thickness of at least 50 μm. The gloss of the cured coating was excellent. A composition without the sag control agent, but of otherwise the same formulation, already displayed sagging at a coating thickness of 30 μm.

EXAMPLE 7

To a mixture of 500.0 parts of an 80%-solution in Solvesso 150 of resin C and 7.77 parts of aniline was added with vigorous stirring and at room temperature a solution in 30 parts of Solvesso 150 of 18.04 parts of the heterocyclic triisocyanate. Subsequently, the reaction mixture was stirred for another 5 minutes.

To 126.1 parts of the thixotropic resin solution thus prepared were still added 110.0 parts of a 60%-solution in butanol of a partially butoxylated melamine resin, 38.5 parts of an 80%-solution in Solvesso 150 of resin C, 133.5 parts of rutile titanium dioxide, 155 parts of xylene and 30 parts of dipentene. The composition prepared had a solids content of 55% at a spraying consistency of 25 seconds.

Next, the thixotropic composition obtained was applied in various coating thicknesses to a vertically positioned steel panel, which while in its vertical position was then cured in a baking oven for 20 minutes at 130° C. The thixotropic composition only started showing sagging at a coating thickness of at least 52 μm. A composition without the sag control agent indicated in this example, but of otherwise the same formulation, already displayed sagging at a coating thickness of 33 μm.

EXAMPLE 8

To a mixture of 600.0 parts of a 65%-solution in ethyl glycol acetate of resin E and 5.32 parts of butylamine was added, with vigorous stirring and at room temperature, a solution in 25 parts of ethyl glycol acetate of 15.75 parts of the heterocyclic triisocyanate. Subsequently, the reaction mixture was stirred for another 5 minutes.

To 37.3 parts of the resulting thixotropic resin solution thus prepared were still added 37.5 parts of the linear trimer of hexamethylene diisocyanate (available under the trade mark Desmodur N of Bayer), 16.0 parts of a 65%-solution in ethyl glycol acetate of resin E, 35.0 parts of rutile titanium dioxide and 82 parts of ethyl glycol acetate. The composition prepared had a solids content of 65% at a spraying consistency of 30 seconds.

The thixotropic composition obtained was then applied in various coating thicknesses to a vertically positioned steel panel, which while in its vertical position was then cured in a baking oven for 20 minutes at 130°

C. The thixotropic composition only started showing sagging at a coating thickness of at least 70 μm. The gloss of the cured coating was excellent. A composition without the sag control agent indicated in this example, but of otherwise the same formulation, already displayed sagging at a coating thickness of 48 μm.

EXAMPLE 9

To a mixture of 500.0 parts of a 50%-solution in xylene of resin B and 8.14 parts of octylamine was added, with vigorous stirring and at room temperature, a solution in 20 parts of xylene of 13.63 parts of the heterocyclic triisocyanate. Subsequently, the reaction mixture was stirred for another 5 minutes.

To 35.6 parts of the thixotropic resin solution thus prepared were still added 19.5 parts of a 60%-solution in butanol of a partially butoxylated melamine resin, 20.0 parts of a 50%-solution in xylene of resin B, 8.1 parts of aluminium pigment, 10 parts of butyl acetate and 38 parts of xylene. The composition prepared had a viscosity of 17 seconds and a solids content of 30%.

Next, the thixotropic composition obtained was applied in various coating thicknesses to a steel panel, which was then cured, while in a vertical position, in a baking oven for 17 minutes at 130° C. The thixotropic composition only started showing sagging at a coating thickness of at least 50 μm. In another experiment the thixotropic composition obtained was sprayed onto a steel panel in a coating thickness of 40 μm and cured for 17 minutes at a temperature of 130° C. The clarity of the cured coating was superior to that of a coating of a similar composition without sag control agent.

EXAMPLE 10

To a mixture of 500.0 parts of resin D and 52.2 parts of a 33.3%-solution in white spirit of stearylamine was added with vigorous stirring and at room temperature a solution in 20.0 parts of xylene of 14.0 parts of the heterocyclic triisocyanate. Subsequently, the reaction mixture was stirred for another 5 minutes.

To 41.4 parts of the thixotropic resin solution thus prepared were still added 52.8 parts of a 33%-solution in white spirit of resin D, 77.4 parts of rutile titanium dioxide, 16.2 parts of a solution in 17.0 parts of white spirit of cobalt octoate (0.38%, based on total), zirconium octoate (3.45%, based on total) and calcium octoate (1.81%, based on total). The composition prepared had a solids content of 81.5% by weight.

Subsequently, the thixotropic composition was applied to a glass plate in various coating thicknesses, and, with the plate in vertical position, cured at 20° C. The thixotropic composition only started showing sagging at a coating thickness of at least 100 μm. The gloss of the cured coating was excellent. A composition without the sag control agent, but of otherwise the same formulation already displayed sagging at a coating thickness of 75 μm.

EXAMPLE 11

To a mixture of 500 parts of resin D and 7.16 parts of ehtanolamine was added with vigorous stirring and at room temperature a solution in 30.0 parts of xylene of 25.38 parts of the heterocyclic triisocyanate. Subsequently, the reaction was stirred for another 5 minutes.

To 39.7 parts of the thixotropic resin solution thus prepared were still added 52.8 parts of resin D, 77.4 parts of rutile titanium dioxide, 16.2 parts of a solution in 19.0 parts of white spirit of cobalt octoate (0.38%, based on total), zirconium octoate (3.45%, based on total) and calcium octoate (1.81%, based on total). The composition prepared had a solids content of 81.5% at a spraying consistency of 30 seconds.

Subsequently, the thixotropic composition obtained was applied to a glass plate in various coating thicknesses, and, with the plate in vertical position, cured at 20° C. The thixotropic composition only started showing sagging at a coating thickness of at least 100 μm. The gloss of the cured coating was excellent and the composition showed excellent levelling. A composition without the sag control agent indicated in this example, but of otherwise the same formulation, already displayed sagging at a coating thickness of 75 μm.

EXAMPLE 12

To a mixture of 500.0 parts of an 80%-solution in Solvesso 150 of resin C and 9.01 parts of 6-aminohexanol was added, with vigorous stirring and at room temperature, a solution in 25.0 parts of Solvesso 150 of 16.65 parts of the heterocyclic triisocyanate. Subsequently, the reaction mixture was stirred for another 5 minutes.

To 124.9 parts of the thixotropic resin solution thus prepared were still added 110.0 parts of a 60%-solution in butanol of a partly butoxylated melamine resin, 38.5 parts of an 80%-solution in Solvesso 150 of resin C, 133.5 parts of rutile titanium dioxide, 157 parts of xylene and 30 parts of dipentene. The composition prepared had a solids content of 55% at a spraying consistency of 25 seconds.

Subsequently, the thixotropic composition obtained was applied in various coating thicknesses to a vertically positioned steel panel, which while in its vertical position was then cured in a baking oven for 20 minutes at 130° C. The thixotropic composition only started showing sagging at a coating thickness of at least 55 μm. The gloss of the cured coating was excellent. A composition without the sag control agent indicated in this example, but of otherwise the same formulation already displayed sagging at a coating thickness of 33 μm.

EXAMPLE 13

To a mixture of 284.5 parts of xylene and 106.5 parts of benzylamine was added, with vigorous stirring and at room temperature, a solution in 430.0 parts of xylene of 215.0 parts of the heterocyclic triisocyanate. The resulting dispersion as such was applied or use was made of the powdered sag control agent obtained after removing the solvent.

10 parts of the dispersion prepared or 3 parts of the powder prepared were mixed with 56.3 parts of an 80%-solution in xylene of resin C and 13.7 or 20.7 parts of xylene. The resulting mixtures were ground to a fineness of less than 15 μm.

To 63 parts of each of the thixotropic resin solutions thus prepared were still added 110.0 parts of a 60%-solution in n-butanol of a partially butoxylated melamine resin, 69.4 parts of a 60% -solution in n-butanol of resin C, 133.5 parts of rutile titanium dioxide, 160 parts of xylene and 30 parts of dipentene. The resulting compositions had a solids content of 55% at a spraying consistency of 25 seconds.

Subsequently, the thixotropic compositions obtained were applied in various coating thicknesses to vertically positioned steel panels, which while in their vertical position were then cured in a baking oven for 20 minutes at 130° C. The thixotropic compositions only started showing sagging at a coating thickness of at least 50 μm. The gloss of the cured coatings was excellent. A composition without the sag control agent indicated in this example, but of otherwise the same formulation, already displayed sagging at a coating thickness of 33 μm.

EXAMPLE 14

To a mixture of 470 parts of a 76.5%-solution of resin A in butyl acetate and 4.51 parts of methoxypropyl amine was added with vigorous stirring and at room temperature a solution of 10.96 parts of the heterocyclic triisocyanate in 30 parts of butyl acetate. Subsequently, the reaction mixture was stirred for another 30 minutes.

To 12.5 parts of the thixotropic resin solution thus prepared were still added 29.8 parts of a 76.5%-solution of resin A in butyl acetate, 1.0 part of a 1%-solution of dibutyltin dilaurate in xylene, 12 parts of butyl glycol acetate, 19.3 parts of the cyclic trimer of hexamethylene diisocyanate (available under the trademark Desmodur N3390 of Bayer) as curing agent and 8 parts of butyl acetate. The clear coating composition prepared had a solids content of 60% at a spray consistency of 30 seconds. Immediately after the components had been intermixed, the resulting thixotropic composition was applied in the same way as indicated in Example 1 and cured in a baking oven for 30 minutes at a temperature of 90° C. The thixotropic composition only started showing sagging at a coating thickness of at least 50 μm. The composition without the sag control agent already displayed sagging at a coating thickness of 35 μm, the two coatings showing the same gloss and the same clarity values.

We claim:

1. A thixotropic coating composition comprising (1) a binder and (2) 0.1 to 30 percent by weight of solid particles of a polyurea sag control agent which is the reaction product of (a) an isocyanurate-trimer from a diisocyanate containing 3–20 carbon atoms and (b) an amine containing one or more primary amino groups.

2. The coating composition of claim 1, wherein the isocyanurate trimer is from a diisocyanate containing 5–14 carbon atoms.

3. The coating composition of claim 2, wherein the isocyanurate trimer is from hexamethylene diisocyanate.

4. A process for coating a substrate with a coating composition, comprising coating said substrate with the coating composition of claim 1.

5. A coated substrate obtained by the process according to claim 4.

6. A coated substrate comprising a substrate which has been coated with the composition of claim 1.

* * * * *